April 7, 1942.                B. COTTER                2,278,691
                         FASTENING DEVICE
                       Filed March 15, 1939

Inventor
Bart Cotter
By Blackmore, Spencer & Flint
Attorneys

Patented Apr. 7, 1942

2,278,691

UNITED STATES PATENT OFFICE 2,278,691

FASTENING DEVICE

Bart Cotter, Detroit, Mich., assignor to General Motors Corporation, Detroit, Mich., a corporation of Delaware Application March 15, 1939, Serial No. 261,914

6 Claims. (Cl. 24—73)

This invention relates to fastening devices and has particular reference to a fastening device used to secure electric wires to the bottom of the floor of an automotive vehicle.

In the prior art the devices used had a part which projected above the upper surface of the floorboard and while they were satisfactory as far as securing the wires in place was concerned, these devices were objectionable because of the projection above the surface of the floor. A fabric covering is usually placed over the floor of the automobile and if a projecting part appears under the carpet, such as the sharp edge or corner of a fastening device, it interferes with the smooth surface of the floor and also causes a hole to wear in the cover. This has been very objectionable and the object of the present invention is to make a fastening device and so design it in connection with use on the floor of the automotive vehicle that no part will project above the upper surface of the floor, so that the smooth floor surface will be left intact.

The invention is accomplished by forming a number of indentations or depressions in the floor and shearing the material at one side of this depression so that an opening is left between the lower surface of the floor and the shorn edge of the depression. In this opening the clip or fastening device of the invention is inserted and this fastening device has a finger formed from the base of the fastening device and projecting away therefrom and as the base and the finger are inserted in the opening at the edge of the projection, the finger will pass under the lower surface of the floor and spring up into the depression and the edge of the finger will engage the edge of the floor at the opening to prevent the removal of the clip or fastening device.

The finger is preferably bent from the base on a line diagonal thereto so that the line of the edge of the finger will form an acute angle with the plane of the base.

On the drawing

Figure 1:
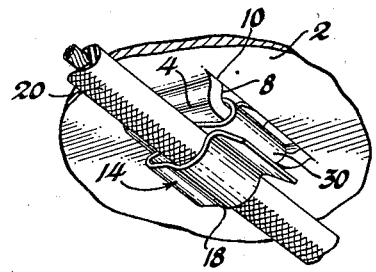
Figure 1 shows a view of the underside of an automotive vehicle with the fastening device in place and holding an electric wire.
Figure 2:
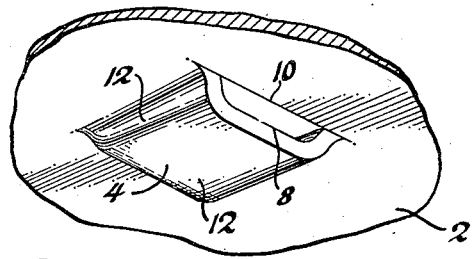
Figure 2 is a view similar to Figure 1 but showing the fastening device and wire removed.

Referring to the drawing, the numeral 2 indicates the floor of an automotive vehicle, although it may be any other surface to which the fastening device may be applied. At suitable and convenient parts of the floor a depressed part such as shown at 4 is formed by pressing the metal of the floor downwardly from the surface 6 thereof. This depressed part 4 is shorn away at one side as indicated at 8 to leave an edge on the floor at 10 against which a part of the fastening device may engage as will be later described. At the other three sides of the depressed part 4, the metal is not shorn but is integral with the floor as indicated at 12.

Figure 3:
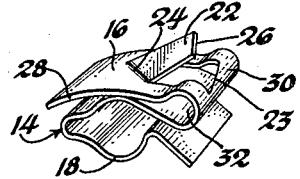
Figure 3 is a perspective view of the clip or fastening device.
Figure 4:
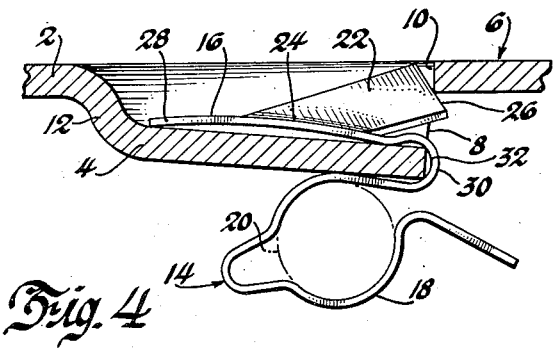
Figure 4 is an enlarged sectional view through the floor at one of the depressions and showing the fastening device in place.
Figures 5, 6:
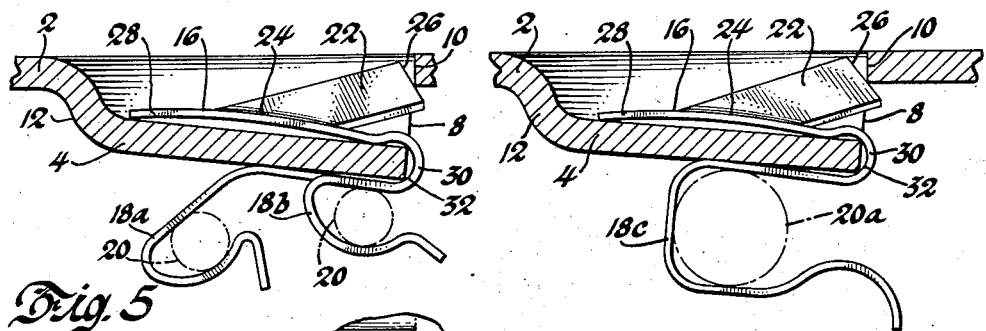
Figures 5 and 6 are views similar to Figure 4 but showing different forms of the fastening device.

The fastening device of the invention is indicated as a whole at 14. This fastening device comprises the relatively flat base 16 and the holding part 18 which is adapted to receive and hold the electric wire 20. The base 16 is substantially flat but having a slight curvature as is best shown in Figures 4, 5, and 6, and from the base part a finger 22 is bent away therefrom. This finger is formed from the base part 16, the sides of the opening formed by the finger being parallel to the sides of the base 16, but the end 26 of the finger being formed at an acute angle to the end edge of the base. Compare the inclination of the line 23 (Figure 3) with the edge line at the rounded part 30. The finger is bent on the line 24 which is substantially on a diagonal of the base 16. The reason for bending the finger 22 on the diagonal 24 is so that the edge face 26 of the finger will be at an angle to the edge 10 of the floor and engage the floor at a point as is shown in Figures 4, 5, and 6. The reason for having the finger edge 26 formed along the inclined line 23 is to cause the fastener to creep inward to the position of Figure 4 in case the fastener should not initially be pushed to the position of Figure 4. The inclination of the edge 26 will continually cause the fastener to work to its final position. The engaging length of the edge at 26, placed at the angle shown in Figures 4, 5, and 6, will be much longer vertically than the engaging edge would be if the finger 22 were bent at right angles to the sides 28 of the base.

The base 16 and holding part 18 are integral with each other and connected by the rounded part 30 which is shaped to form the eye indicated at 32.

The application of the device is as follows: the end or tip of the base 16 of the clip is placed in the opening at the end of the projection 4 and by forcing the clip to the left (Figures 4, 5 and 6) the finger 22 will ride under the lower surface of the floor 2 and when its tip 26 has passed the edge 10 it will spring upwards so that the edge 26 will engage against the edge 10 if the opening. The rounded part 30 and the eye 32 will allow the base to expand relative to the holding part and the edge at 8 of the metal at the opening will be received in the eye 32. It will be noted from Figures 4, 5 and 6 that the securing edge 26 of the fastening device has the uppermost part below the upper surface 6 of the floor so that smooth floor surface is uninterrupted and the usual carpet or covering may be placed on the floor without interference by any projection.

Figure 7:
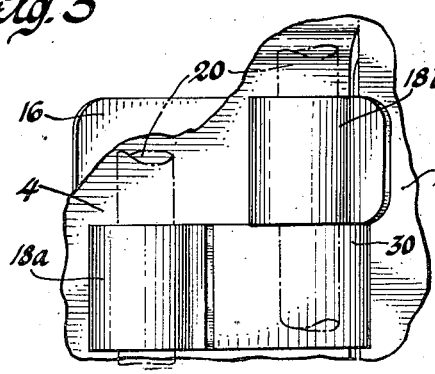
Figure 7 is a bottom plan view of the structure of Figure 5.

In Figures 5, 6, 7 and 8 the only difference in the clip is in the shape of the holding part. In Figures 5 and 7 the clip has the two arms 18a and 18b each of which is adapted to hold a wire 20 and in Figure 6 the holding part 18c is of different shape to hold a somewhat larger diameter wire 20a, but in each instance the finger 22 and the manner of application is the same.

Figure 8:
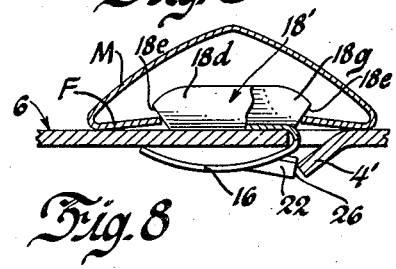
Figure 8 is a sectional view of a modification.

In Figure 8 the floor 8 (or the body side) has no depression, but merely a shorn finger 4' to make an opening for the insertion of the fastener. A holding part 18' comprises two lateral wings 18d and 18g having inclined sides 18e against which the edges of flanges F of a molding M are adapted to abut to hold the molding in place. The structure of parts 16, 22 and 26 are the same as in the species of Figure 3.

I claim:
1. In combination with the metal floor of an automotive vehicle, a plurality of depressions formed in the floor by pressing the metal away from the floor, the metal at one side of said depression being shorn away from the floor to leave an opening at one side, a fastening device adapted to be secured in the depressed part and projecting away from the floor on the underside thereof, said device having a part entering the opening and being secured in the depression, but lying below the plane of the upper surface of the floor, said part entering the opening being wider than the opening, a finger on said part, said finger being sprung into the depression and past the edge of the opening, the edge of the finger engaging the edge of the opening when the fastening device is in place.

2. In combination with the metal floor of an automotive vehicle, a plurality of depressions formed in the floor by pressing the metal away from the floor, the metal at one side of said depression being shorn away from the floor to leave an opening at one side, a fastening device adapted to be secured in the depressed part and projecting away from the floor on the underside thereof, said device having a base and a finger pressed away from the base, said finger and said base adapted to be inserted into the opening in the floor and be received in the depression, the edge of said finger engaging with the edge of the opening at a single point to prevent withdrawal of the device, the part of the device entering the depression and opening lying below the plane of the upper surface of the floor.

3. In a fastening device adapted to be applied to an opening and comprising a base and a holding part, said base being generally flat, said base and holding part being bent upon each other to form a rounded part, said rounded part limiting the extent to which the clip is insertable in the opening, a flat broad finger bent away from the flat of the base intermediate its ends and on substantially a diagonal thereof, and an end edge on said finger having substantially a point engagement with the edge of the opening to prevent the withdrawal of the device when in place.

4. In a fastening device adapted to be applied to an opening and comprising a base and a holding part, said base being generally flat, said base and holding part being bent upon each other to form a rounded part, said rounded part limiting the extent to which the clip is insertable in the opening, a finger bent from the flat of the base intermediate its ends, and an end edge on said finger adapted to engage with the edge of the opening to hold the device in place, the line of the end edge of said finger being transverse to the edge of the opening to give the edge of the finger a longer possible contact surface.

5. In a fastening device adapted to be applied to an opening and comprising a base and a holding part, said base being generally flat, said base and holding part being bent upon each other to form a rounded part, said rounded part limiting the extent to which the clip is insertable in the opening, a finger bent away from the flat of the base intermediate the ends thereof on substantially a diagonal thereof, and an end on said finger adapted to engage with the edge of the opening to hold the device in place, the engaging edge of said finger being out of parallelism with the edge of the opening to give to the finger a longer possible contact surface and forming an angle other than a right angle with the lateral edge of the finger.

6. In a fastening device adapted to be applied to an opening and comprising a base and a holding part, said base being generally flat, said base and holding part being bent upon each other to form a rounded part, said rounded part limiting the extent to which the clip is insertable in the opening, a finger bent away from the flat of the base intermediate the ends thereof, and an end edge on said finger adapted to engage with the edge of the opening to hold the device in place, the line of the end edge of said finger being out of parallelism with the edge of the opening and forming an actute angle with the plane of the base to give the edge of the finger a longer possible contact surface, the engaging edge of said finger forming an angle other than a right angle with the lateral edge of the finger.

BART COTTER.